US011345076B2

(12) United States Patent
Vidal Garrido

(10) Patent No.: US 11,345,076 B2
(45) Date of Patent: May 31, 2022

(54) METHOD FOR COPYING A SURFACE TEXTURE OF A SURFACE CARRIER OBJECT TO AN AIRTIGHT THERMOPLASTIC SURFACE LAYER OF AN INTERIOR CLADDING COMPONENT OF A VEHICLE

(71) Applicant: MOTHERSON INNOVATIONS COMPANY LIMITED, London (GB)

(72) Inventor: Antonio Vidal Garrido, Barcelona (ES)

(73) Assignee: Motherson Innovations Company Limited, London (GB)

( * ) Notice: Subject to any disclaimer, the term of this patent is extended or adjusted under 35 U.S.C. 154(b) by 120 days.

(21) Appl. No.: 16/744,664

(22) Filed: Jan. 16, 2020

(65) Prior Publication Data
US 2020/0238597 A1    Jul. 30, 2020

(30) Foreign Application Priority Data

Jan. 24, 2019    (EP) .................................... 19153542

(51) Int. Cl.
*B29C 59/02*    (2006.01)
*B33Y 80/00*    (2015.01)
(Continued)

(52) U.S. Cl.
CPC .......... *B29C 59/022* (2013.01); *B29C 59/002* (2013.01); *B33Y 80/00* (2014.12); *B33Y 10/00* (2014.12)

(58) Field of Classification Search
CPC ...... B29C 59/022; B29C 59/002; B33Y 80/00
See application file for complete search history.

(56) References Cited

U.S. PATENT DOCUMENTS 3,244,571 A    4/1966 Weisman
4,092,200 A    5/1978 Nomura et al.
(Continued)

FOREIGN PATENT DOCUMENTS

DE    10 2016 112 505 A1    1/2018
EP    0 299 168 A2    1/1989
(Continued)

OTHER PUBLICATIONS

English translation of WO 2014/013563 (Year: 2014).*
European Search Report dated Jul. 16, 2019 with respect to counterpart European patent application 19 15 3542.

*Primary Examiner* — Larry W Thrower
(74) *Attorney, Agent, or Firm* — Ursula B. Day, Esq.

(57) ABSTRACT

A method is disclosed for copying a surface texture of a surface carrier object to an air tight thermoplastic surface layer of an interior cladding component of a vehicle, by fixing the airtight thermoplastic surface layer inside the pressure chamber such that the airtight thermoplastic surface layer divides the pressure chamber into a first and second pressure chamber section by positioning the surface carrier object inside the pressure chamber with a positioning device in the vicinity of the airtight thermoplastic surface layer with the surface texture facing the airtight thermoplastic surface layer. By applying a pressure difference between the first and second pressure chamber section, the airtight thermoplastic surface layer is pressed on the surface carrier object, thereby copying a surface texture of a surface carrier object to an airtight thermoplastic surface layer. An interior cladding component of a vehicle, comprising an airtight thermoplastic surface layer is also disclosed.

10 Claims, 4 Drawing Sheets

(51) Int. Cl.
*B29C 59/00* (2006.01)
*B33Y 10/00* (2015.01)

(56) References Cited

U.S. PATENT DOCUMENTS

2003/0072917 A1* 4/2003 Campbell ......... B29C 45/14795
428/141
2011/0287124 A1 11/2011 Chuang et al.
2019/0176378 A1 6/2019 Hehn et al.

FOREIGN PATENT DOCUMENTS

WO  WO 2014/013563 A1    1/2014
WO  WO-2014013563 A1 *   1/2014  ........... B29C 59/026
WO  WO-2019104320 A1 *   5/2019  ............. B29C 33/04

* cited by examiner

METHOD FOR COPYING A SURFACE TEXTURE OF A SURFACE CARRIER OBJECT TO AN AIRTIGHT THERMOPLASTIC SURFACE LAYER OF AN INTERIOR CLADDING COMPONENT OF A VEHICLE

CROSS-REFERENCES TO RELATED APPLICATIONS

This application claims the priority of European Patent Application Serial No. 19 153542.6, filed Jan. 24, 2019, pursuant to 35 U.S.C. 119(a)-(d), the subject matter of which is incorporated herein by reference.

BACKGROUND OF THE INVENTION

The present invention relates to a method for copying a surface texture of a surface carrier object to an airtight thermoplastic surface layer of an interior cladding component of a vehicle. Moreover the present invention relates to an interior cladding component of a vehicle, comprising an airtight thermoplastic surface layer obtained by such a method.

The vehicle design is becoming a more and more important factor for the purchase decision of the vehicle customers. This is not only true for the exterior vehicle design but also for the interior vehicle design. Particularly the interior design can be tailored according to the individual customer requests. Common examples of the interior design the customer can determine is the color and the material of the seat cover. Usually the interior cladding comprises a number of decoration elements. The decoration elements may have a metal-like or wood-like appearance. Next to the seat cover the vehicle customer may decide on the color of the surface of the interior cladding.

However, only in very rare cases the surface texture of the cladding components can be selected by the vehicle customer. The main reason is that the manufacturing costs for offering different surface textures are unacceptably high. It would therefore be desirable and advantageous to provide an improved method for copying a surface texture of a surface carrier object to an airtight thermoplastic surface layer and the component cladding therefore.

In one exemplary embodiment of the present invention a method for manufacturing a surface texture is disclosed by which a plurality of different surface textures can be provided at acceptable costs.

Furthermore, an embodiment of the present invention has the object to provide an interior cladding component of a vehicle the surface texture of which can be chosen out of a broad variety at reasonable costs.

These objects and others are solved by the features specified in the following recitation, while advantageous embodiments are the subject of further dependent claims.

One embodiment of the present disclosure is directed to a method for copying a surface texture of a surface carrier object to an airtight thermoplastic surface layer of an interior cladding component of a vehicle by means of a manufacturing device, the manufacturing device including,
  a pressure chamber,
  a fixing device for fixing the airtight thermoplastic surface layer inside the pressure chamber such that the airtight thermoplastic surface layer divides the pressure chamber into a first pressure chamber section and a second pressure chamber section,
  a first pressure adjusting unit for adjusting the pressure inside the first pressure chamber section,
  a second pressure adjusting unit for adjusting the pressure inside the second pressure chamber section, and
  a positioning device for positioning the surface carrier object inside the pressure chamber,
the method includes the steps of
  fixing the airtight thermoplastic surface layer inside the pressure chamber by means of the fixing device such that the airtight thermoplastic surface layer divides the pressure chamber into a first pressure chamber section and a second pressure chamber section,
  positioning the surface carrier object inside the pressure chamber by means of the positioning device in the vicinity of the airtight thermoplastic surface layer in the first pressure chamber section or the second pressure chamber section, the surface texture of the surface carrier object facing the airtight thermoplastic surface layer,
  applying a pressure difference between the first pressure chamber section and the second pressure chamber section such that the airtight thermoplastic surface layer is pressed on the surface carrier object, thereby copying a surface texture of a surface carrier object to an airtight thermoplastic surface layer.

Another embodiment relates to the Interior cladding component of a vehicle including an airtight thermoplastic surface layer obtained by the afore-described method.

The present disclosure provides a method for copying a surface texture of a surface carrier object to an airtight thermoplastic surface layer. Similar methods are disclosed in DE 10 2016 112 505 A1, US 2011/0287124 A1 and EP 0 299 168 A2. However, the surface layers used in the methods disclosed in these documents are not airtight so the methods comprise different steps.

The surface layer obtained by the present method can be applied to an interior cladding component of a vehicle. The surface texture of the surface carrier object can be copied in principle as often as desired in a fairly simple and fast way. The costs and the time for providing a given interior cladding component with the selected surface texture are kept low. Due to the fact that the surface layer is airtight the forces needed to copy the surface texture to the surface layer are almost exclusively provided by pressure differences between the first pressure chamber section and the second pressure chamber section. Mechanical units that contact the surface layer for applying forces are not needed. The design of the manufacturing device is thus simple. Moreover the surface layer can be treated in a gentle way avoiding damages. The number of defective surface layers is kept low. In case another surface texture is desired the surface carrier object is exchanged which is not a time consuming step. Thus, the variety of surface textures the vehicle customer can choose from can be increased without a significant effort.

Before the step of applying a pressure difference between the first pressure chamber section and the second pressure chamber section the method according to a further embodiment may comprise the step of heating the airtight thermoplastic surface layer up to or near to the softening point of the airtight thermoplastic surface layer by a heating unit. The heating unit may comprise infrared or halogen lamps. The heating unit may also apply hot air to the surface layer. Due to the fact that the surface layer is made of a thermoplastic it is softened with increasing heat. Therefore the copying of the surface texture from the surface carrier object to the surface layer is facilitated as the force needed is reduced.

In another embodiment the positioning device comprises a moving unit for moving the surface carrier object inside the pressure chamber, the method including the step of placing the surface carrier object on the positioning device in a first position, and activating the moving unit to move the surface carrier object into a second position in the vicinity of the airtight thermoplastic surface layer.

It is not mandatory that the positioning device can move the surface carrier object. However, the possibility to move the surface carrier object within the pressure chamber facilitates the fastening of the surface layer inside the pressure chamber. The fastening of the surface layer inside the pressure chamber can be conducted when the surface carrier object is in the first position and thus at distance from the positioning device. The surface carrier object does not obstruct the fastening of the surface layer inside the pressure chamber.

A further embodiment is characterized in that between the step of placing the surface carrier object on the positioning device in a first position and the step of activating the moving unit to move the surface carrier object into a second position in the vicinity of the airtight thermoplastic surface layer the method includes the step of applying a negative pressure in the first pressure chamber section by the first pressure adjusting unit and in the second pressure chamber section by the second pressure adjusting unit.

In this embodiment a negative pressure is applied in both pressure chamber sections. When moving the surface carrier object to the vicinity of the surface layer the generation of a back pressure between the surface carrier object and the surface layer is reduced.

According to another embodiment after the step of activating the moving unit to move the surface carrier object into a second position in the vicinity of the airtight thermoplastic surface layer the method includes the step of releasing the negative pressure in the pressure chamber section without the surface carrier object.

Usually it takes some time to generate a negative pressure while releasing the negative pressure is a comparatively fast process. In this embodiment of the present method the negative pressure is produced on both pressure chamber sections, i.e. on both sides of the surface layer. The pressure induced forces acting on the surface layer are cancelling each other. After that the negative pressure in the pressure chamber section in which the surface carrier object is located is maintained while in the other pressure chamber section the negative pressure is released. The resulting force is provided within a short time and is pressing the surface layer against the surface carrier object, thereby copying the surface texture from the surface carrier object to the surface layer.

According to a further embodiment the method comprises the steps of applying a negative pressure in the first pressure chamber section by the first pressure adjusting unit and in the second pressure chamber section by the second pressure adjusting unit, and releasing the negative pressure in the pressure chamber section without the surface carrier object.

As previously mentioned the resulting force can be provided within a short time and is pressing the surface layer against the surface carrier object, thereby copying the surface texture from the surface carrier object to the surface layer. As also mentioned it is not mandatory that the positioning device can move the surface carrier object. The method according to this embodiment may also be conducted without a moving unit.

In a further embodiment after the step of releasing the negative pressure in the pressure chamber section without the surface carrier object the method includes the step of releasing the negative pressure in the pressure chamber including the surface carrier object.

After the surface texture is copied from the surface carrier object to the surface layer the crucial step is conducted and no force is needed anymore to press the surface layer against the surface carrier object. Thus the negative pressure in the pressure chamber section including the surface carrier object can be released. No more pressure induced forces are acting on the surface layer anymore.

In another embodiment after the step of releasing the negative pressure in the pressure chamber comprising the surface carrier object the method includes the step of opening the pressure chamber by an opening and closing device, and removing the airtight thermoplastic surface layer from the pressure chamber.

To remove the finalized surface layer the pressure chamber is opened which is now possible as no negative pressure exists inside the pressure chamber anymore.

A further embodiment is characterized in that the method according to one of the preceding embodiments is repeated with the airtight thermoplastic surface layer from the pressure chamber, by, fixing the airtight thermoplastic surface layer removed from the pressure chamber inside the pressure chamber by means of the fixing device such that the surface texture of the surface carrier object is facing the untreated side of the airtight thermoplastic surface layer.

In this embodiment both sides of the surface layer may be provided with the surface texture.

According to another embodiment the surface texture of the surface carrier object is made by a digital printer or a 3D-printer. In this embodiment the surface layer object can be provided in a simple and fast way. In this embodiment the vehicle customer may even create her or his own surface texture on a computer and transfer it to the digital printer or 3D-printer. Thus a very high degree of individualization may be offered at still acceptable costs and efforts.

In a further embodiment of the method the surface texture of the surface carrier object is made of silicone or polyurethane. These materials are particularly suited to provide the surface texture to be copied to the surface layer. The surface texture of the surface carrier object made of silicone or polyurethane may be generated by copying any given surface of a physical entity, be it stone, wood, textile or the like, or by copying a surface generated by digital printers or 3D-printers.

In another embodiment the airtight thermoplastic surface layer is made of a thermoplastic polyolefin, thermoplastic polyurethane or polycarbonate. These materials are particularly suited to be used for surface layers of vehicle cladding components. Moreover, their melting point is fairly low so that the energy consumed during the manufacturing process is modest.

Another implementation of the invention is directed to an interior cladding component of a vehicle, comprising an airtight thermoplastic surface layer obtained by a method according to one of the preceding embodiments. The technical effects and advantages as discussed with regard to the embodiments of the present method equally apply to the interior cladding. Briefly, a given surface layer can be provided with a desired surface texture by a simple and fairly inexpensive process. Beyond that the variety of surface textures a vehicle customer can choose from may be increased without a significant increase of the manufacturing costs.

BRIEF DESCRIPTION OF THE DRAWINGS

The description of currently preferred exemplified embodiments of the present invention is described in detail with reference to the drawings attached wherein.

DETAILED DESCRIPTION OF PREFERRED EMBODIMENTS

Reference will now be made in detail to the present exemplary embodiments of the disclosure, example of which are illustrated in the accompanying drawings. Whenever possible, the same or similar reference numbers will be used throughout.

Figure 1:
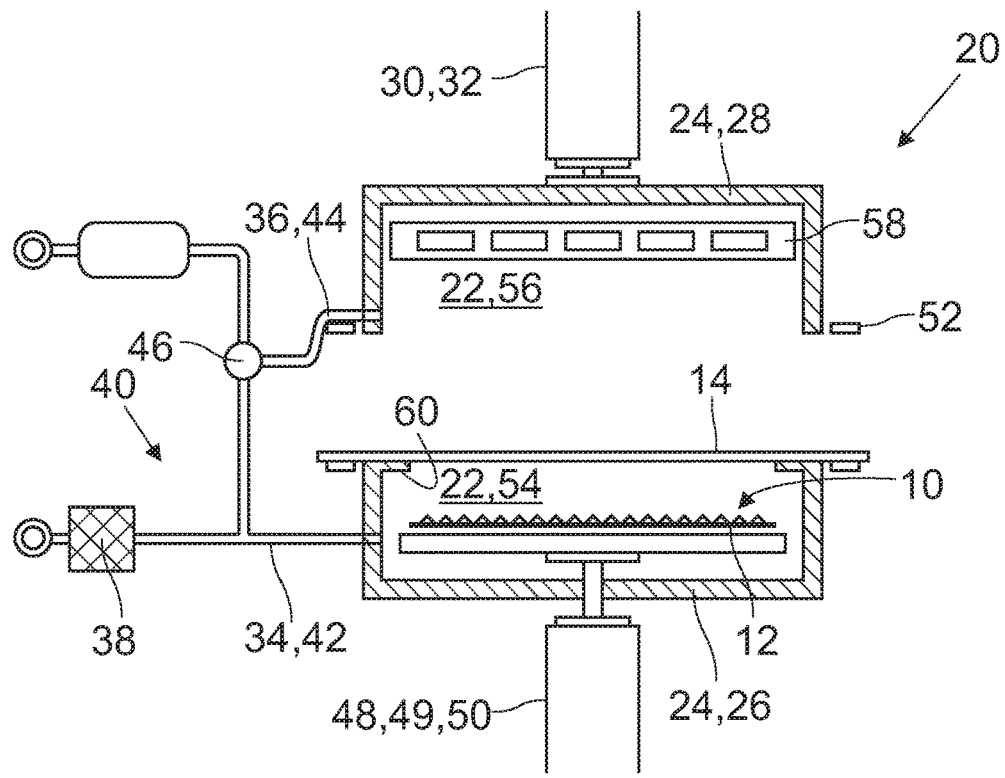
FIGS. 1 to 6 show different steps of one embodiment of a method according to the present invention by means of principle drawings.
Figure 4:
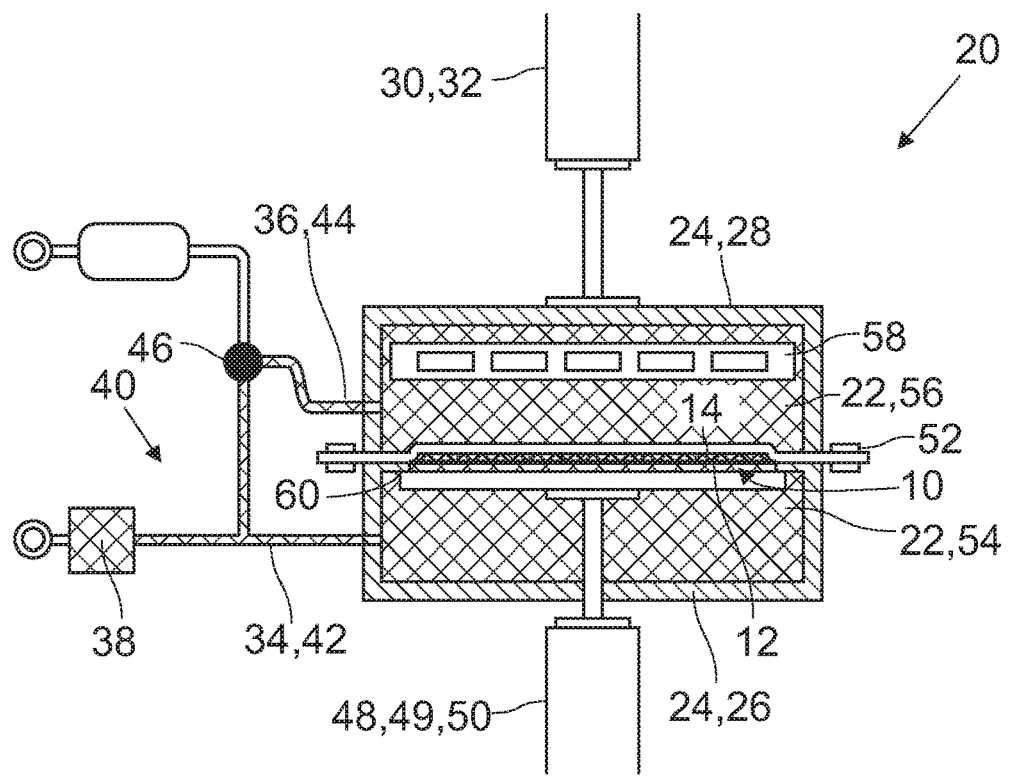
Figure 5:
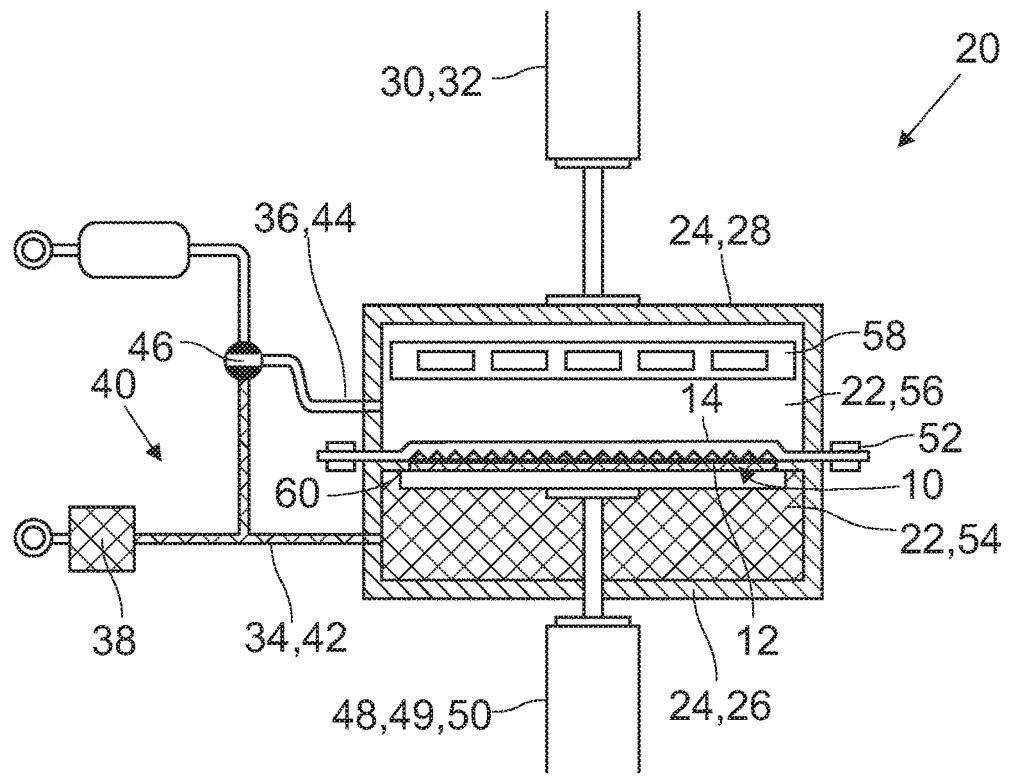
Figure 6:
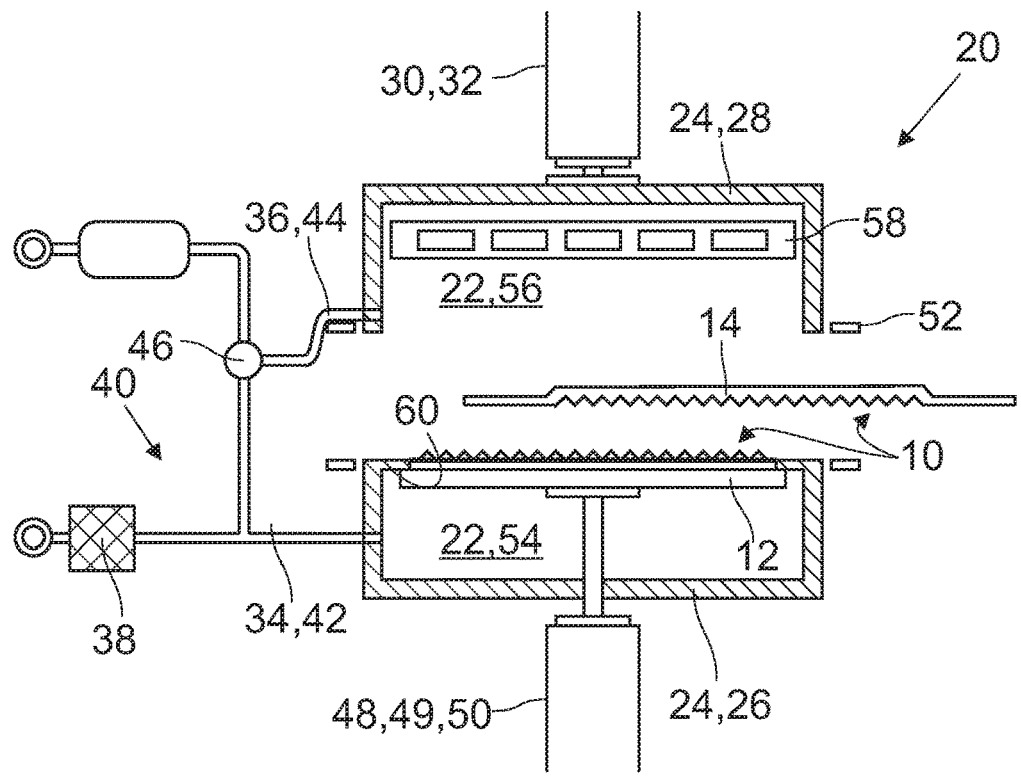
Figure 8:
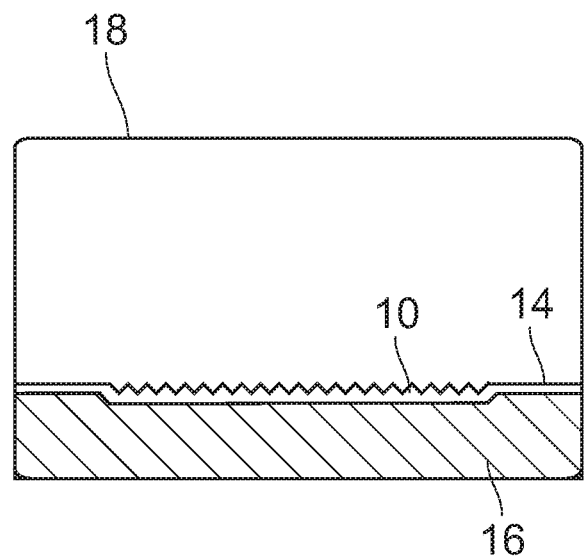
FIG. 8 shows an interior cladding component of a vehicle, also by means of a principle drawing.

In FIGS. 1 to 6 different steps of one embodiment of an inventive method for copying a surface texture 10 of a surface carrier object 12 to an airtight thermoplastic surface layer 14 of an interior cladding component 16 of a vehicle 18 (see FIG. 8). The method is conducted in a manufacturing device 20 that comprises a pressure chamber 22 having a housing 24 that is encompassing the pressure chamber 22. The housing is subdivided into a first housing part 26 and a second housing part 28. At least one of the housing parts, in the embodiment shown the second housing part 28, is translationally movable relative to the first housing part 26 between an open position that is shown in FIGS. 1 and 6 and a closed position that is shown in FIGS. 2 to 5. The second housing part 28 can be shifted between the open position and the closed position by an opening and closing device 30 that may comprise a piston-cylinder-unit 32. In the open position the pressure chamber 22 is accessible from outside while in the closed position the pressure chamber 22 is hermetically sealed.

The manufacturing device 20 further comprises a first pressure adjusting unit 34 and a second pressure adjusting unit 36 for adjusting the pressure inside the pressure chamber 22. In the embodiment shown the manufacturing device 20 comprises a vacuum pump 38 that is in fluid communication with the pressure chamber 22 by a hose system 40 that comprises a first hose 42 and a second hose 44. The first hose 42 is connected to the pressure chamber 22 through the first housing part 26 whereas the second hose 44 is connected to the pressure chamber 22 through the second housing part 28. Thus, the first pressure adjusting unit 34 comprises the first hose 42 and the second pressure adjusting unit 36 comprises the second hose 44. The hose system 40 comprises a valve 46 by which the fluid communication between the first hose 42 and the second hose 44 can be established and interrupted. Moreover, the first hose 42 and the second hose 44 may be exposed to the atmospheric pressure by the valve 46.

The manufacturing device 20 is equipped with a positioning device 48 for positioning the surface carrier object 12 inside the pressure chamber 22. Like the opening and closing device 30 the positioning device 48 may comprise a moving unit 49 having a piston-cylinder-unit 50 for translationally moving the surface carrier object 12 within the pressure chamber 22.

The surface carrier object 12 comprises the surface texture 10 that is to be copied to the surface layer 14. The surface layer 14 is fixed inside the pressure chamber 22 by means of a fixing device 52. The surface layer 14 is fixed such that it completely penetrates the pressure chamber 22. When the second housing part 28 is moved into the closed position the surface layer 14 subdivides the pressure chamber 22 into a first pressure chamber section 54 and a second pressure chamber section 56 that are hermetically and airtightly divided from each other by the surface layer 14.

The manufacturing device 20 is furnished with a heating unit 58 that comprises a number of infrared lights.

Figure 2:
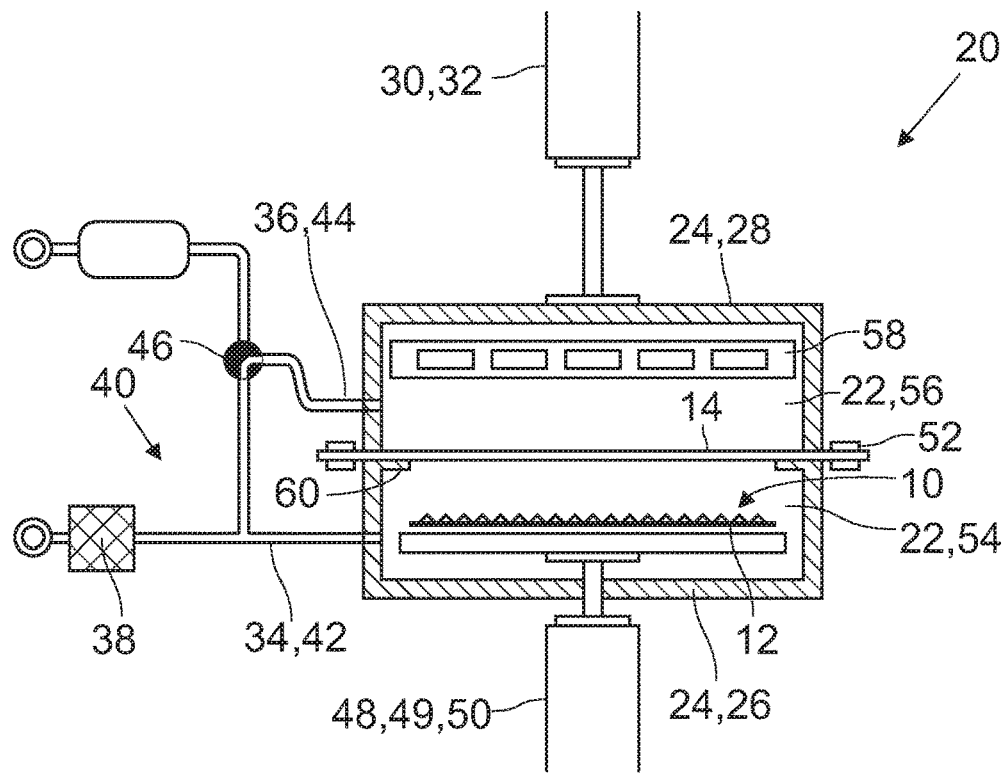

In the following the operation of the manufacturing device 20 according to one embodiment of the inventive method is described. In FIG. 1 the second housing part 28 is located in the open position. Thus the pressure chamber 22 is accessible from the outside. The positioning device 48 is located in a first position near the bottom of the pressure chamber 22. The valve 46 is in a position in which the first hose 42 and the second hose 44 are exposed to atmospheric pressure. The surface layer 14 is placed into the fixing device 52 and the second housing part 28 moved into the closed position as shown in FIG. 2. As also evident from FIG. 2 the valve 46 is switched into a position in which the first hose 42 and the second hose 44 are both connected to the vacuum pump 38.

Figure 3:
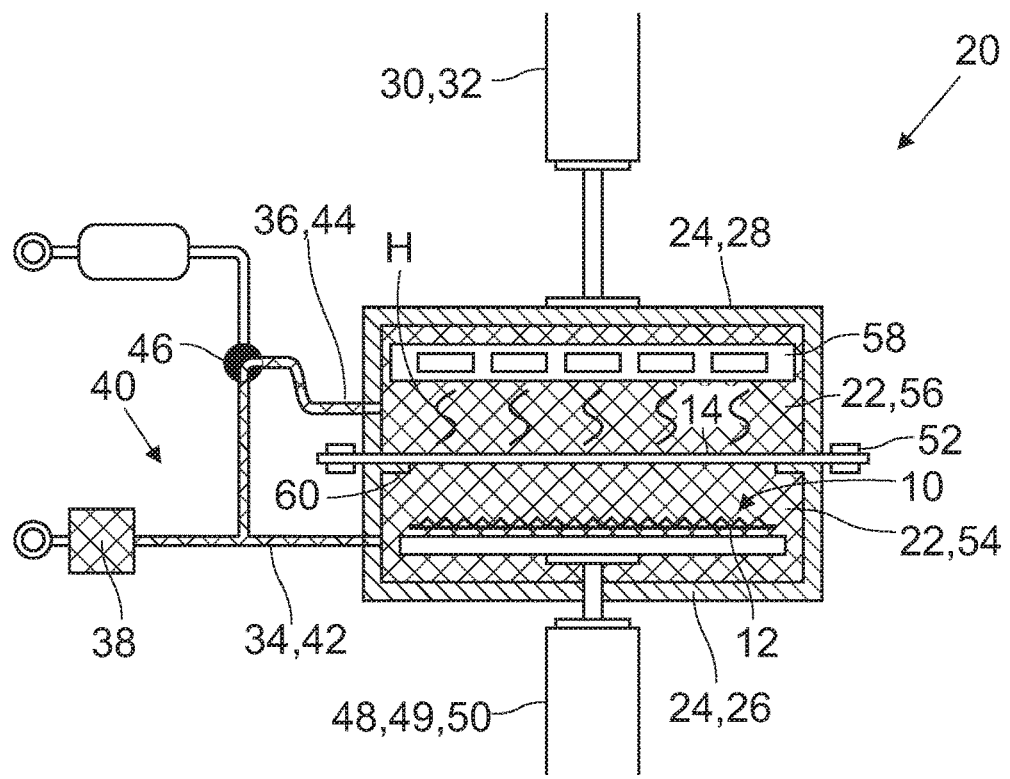

In FIG. 3 the vacuum pump 38 is turned on thereby applying a negative pressure in the first pressure chamber section 54 and the second pressure chamber section 56. The negative pressure is symbolized by the crosshatching. Further, the heating unit 58 is turned on, thereby heating up the surface layer 14. The heat generated by the heating unit 58 is symbolized by the sinuous lines H in FIG. 3.

As shown in FIG. 4 the valve 46 is closed once the desired negative pressure is reached. The negative pressure is thus maintained inside the pressure chamber 22. The vacuum pump 38 may now be turned-off. The moving unit 48 of the positioning device 48 is now activated and moves the surface carrier object 12 into a second position. The first housing part 26 comprises protrusions 60 extending into the pressure chamber 22 on which the positioning device 48 abuts in the second position. In the embodiment shown the surface carrier object 12 is touching the surface layer 14 so that it is slightly deformed towards the heating unit 58.

As demonstrated in FIG. 5 the valve 46 is now switched into a position in which the second pressure chamber section 56 is exposed to atmospheric pressure while the first pressure chamber section 54 is still airtightly closed. As a result the surface layer 14 is sucked towards the first pressure chamber section 54 and towards the surface carrier object 12. The surface layer 14 is thereby pressed on the surface carrier object 12 and the surface texture 10 of the surface carrier object 12 is copied to the side of the surface layer 14 facing the surface carrier object 12.

It is also possible to create a positive pressure in the second pressure chamber section 56 so that the pressure difference between the first pressure chamber section 54 and the second pressure chamber section 56 is increased (not shown). The forces pressing the surface layer 14 to the surface carrier object 12 are thereby increased.

After that the valve 46 is switched into a position in which also the first pressure chamber section 54 is exposed to atmospheric pressure. The second housing part 28 is moved into the open position by activating the opening and closing device 30. The surface layer 14 now comprising the surface texture 10 copied from the surface carrier object 12 can now be removed from the manufacturing device 20 (see FIG. 6). The process can now be repeated either using another surface layer 14 or turning over the removed surface layer 14 to copy the surface texture 10 to the untreated surface.

Figure 7:
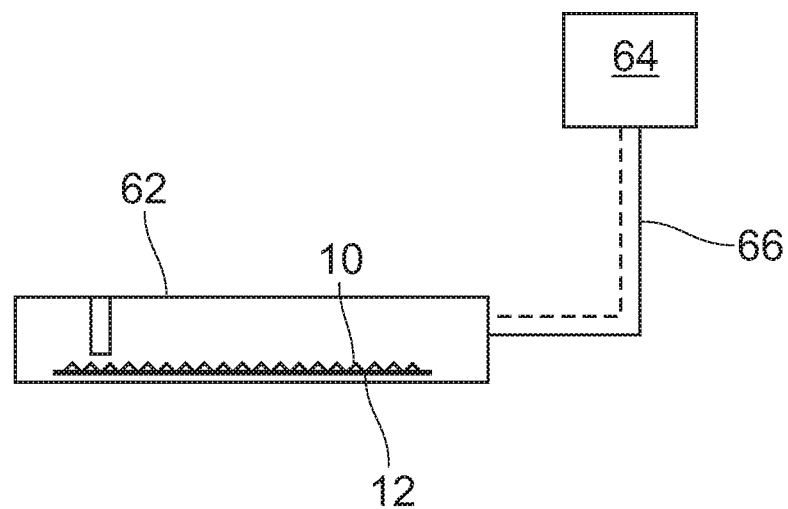
FIG. 7 shows a printer configured to provide a surface carrier object by means of a principle drawing.

In FIG. 7 a printer 62, either a digital printer or a 3D-printer, is shown that is generating the surface carrier object 12. The surface carrier object 12 or its surface texture 10 may be made of any suitable object such as stone, metal, wood textile or the like. Alternatively the surface carrier object 12 may be generated by means of a digital printer or a 3D-printer or may be a negative copy of any of these objects. Moreover, the surface carrier object 12 may be made of silicone or polyurethane. The printer 62 is controlled by a computer 64. The properties and the design of the surface texture 10 are defined by the computer 64 and then transferred to the printer 62. The respective data may be transferred by wire 66 or wireless, the latter being symbolized by the dashed line. It is possible that the vehicle 18 customer can design the surface texture 10 of the surface layer 14 she or he wants the interior cladding component 16 to be covered with.

In FIG. 8 an interior cladding component 16 of a vehicle 18 covered with a surface layer 14 comprising the surface texture 10 copied from the surface carrier object 12 is shown by means of a principle sketch. The interior cladding component 16 may be an armrest or the instrument panel.

While the invention has been illustrated and described as embodied in, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method for copying a surface texture of a surface carrier object to an airtight thermoplastic surface layer of an interior cladding component of a vehicle with a manufacturing device, comprising,
   fixing the airtight thermoplastic surface layer inside a pressure chamber with a fixing device such that the airtight thermoplastic surface layer divides a pressure chamber into a first pressure chamber section and a second pressure chamber section,
   positioning the surface carrier object inside the pressure chamber by a positioning device in adjacent the airtight thermoplastic surface layer in the first pressure chamber section or the second pressure chamber section, a surface texture of the surface carrier object facing the airtight thermoplastic surface layer,
   placing the surface carrier object on the positioning device in a first position, and
   applying a negative pressure in the first pressure chamber section by a first pressure adjusting unit and in the second pressure chamber section by a second pressure adjusting unit,
   activating a moving unit to move the surface carrier object into a second position in which the surface carrier is in a vicinity of the airtight thermoplastic surface layer,
   applying a pressure difference between the first pressure chamber section and the second pressure chamber section such that the airtight thermoplastic surface layer is pressed on the surface carrier object, thereby copying the surface texture of the surface carrier object to the airtight thermoplastic surface layer.

2. The method according to claim 1, wherein before applying a pressure difference between the first pressure chamber section and the second pressure chamber section, further comprising,
   heating the airtight thermoplastic surface layer up to or near to a softening point of the airtight thermoplastic surface layer by a heating unit.

3. The method according to claim 1, wherein after activating the moving unit to move the surface carrier object into a second position in which the surface carrier is in the vicinity of the airtight thermoplastic surface layer, further comprising,
   releasing the negative pressure in the pressure chamber section without the surface carrier object.

4. The method according to claim 1, further comprising,
   applying a negative pressure in the first pressure chamber section by the first pressure adjusting unit and in the second pressure chamber section by the second pressure adjusting unit, and
   releasing the negative pressure in the pressure chamber section without the surface carrier object.

5. The method according to claim 4, wherein after releasing the negative pressure in the pressure chamber section without the surface carrier object, further comprising,
   releasing the negative pressure in the pressure chamber section comprising the surface carrier object.

6. The method according to claim 5, wherein after releasing the negative pressure in the pressure chamber comprising the surface carrier object, further comprising,
   opening the pressure chamber by an opening and closing device, and
   removing the airtight thermoplastic surface layer from the pressure chamber.

7. The method according to claim 6, further comprising,
   fixing the airtight thermoplastic surface layer removed from the pressure chamber inside the pressure chamber by the fixing device such that the surface texture of the surface carrier object is facing an untreated side of the airtight thermoplastic surface layer.

8. The method according to claim 1, wherein the surface texture of the surface carrier object is made by a digital printer or a 3D-printer.

9. The method according to claim 1, wherein the surface texture of the surface carrier object is made of silicone or polyurethane.

10. The method according to claim 1, wherein the airtight thermoplastic surface layer is made of a thermoplastic polyolefin, thermoplastic polyurethane or polycarbonate.

* * * * *